(No Model.) 2 Sheets—Sheet 1.
T. H. McCRAY.
Road Engine.
No. 236,832. Patented Jan. 18, 1881.
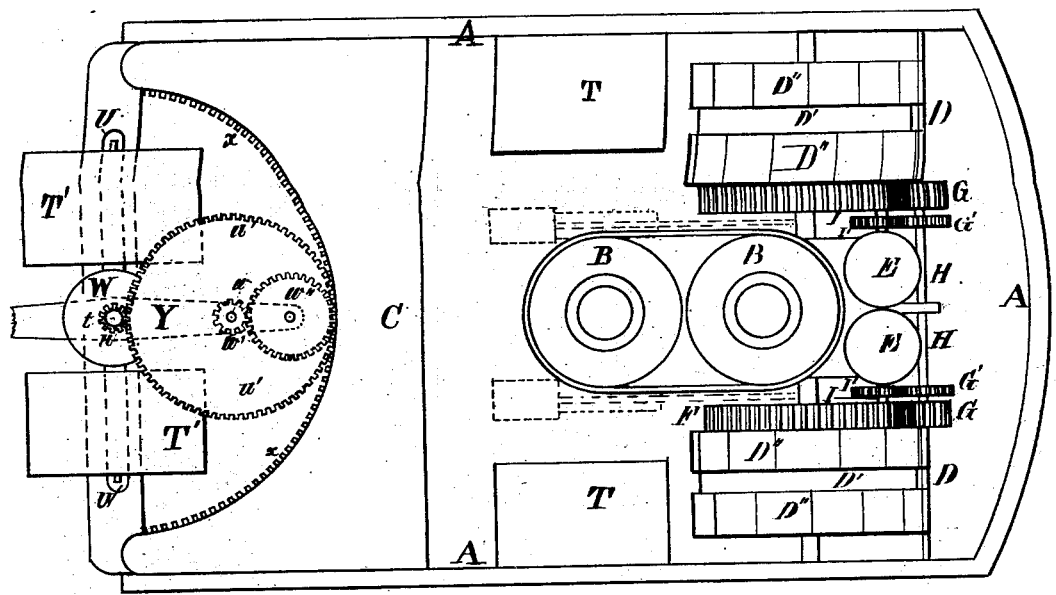
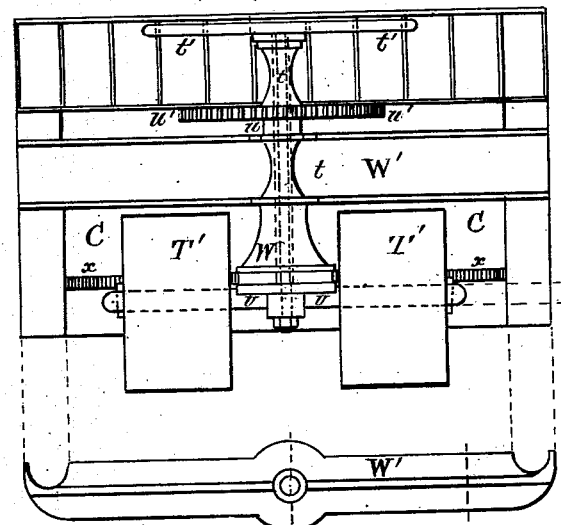
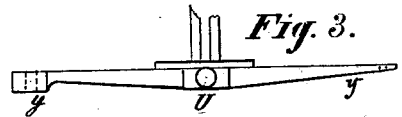
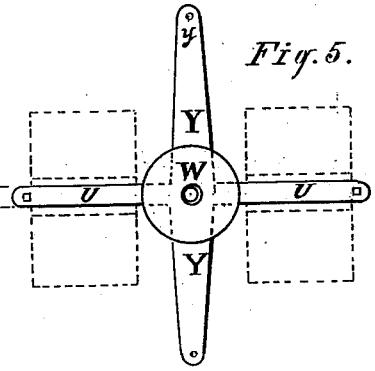
Witnesses
R. P. Edwards
A. K. Williams
Inventor
Thos. H. McCray
Per W. R. Singleton
Atty

UNITED STATES PATENT OFFICE.

THOMAS H. McCRAY, OF TYRONZA, ARKANSAS.

ROAD-ENGINE.

SPECIFICATION forming part of Letters Patent No. 236,832, dated January 18, 1881.

Application filed May 4, 1880. (No model.)

*To all whom it may concern:*

Be it known that I, THOMAS H. MCCRAY, of Tyronza, in the county of Cross and State of Arkansas, have invented certain Improvements in Traction or Road Engines, of which the following is a specification.

This invention relates to improvements in road engines or locomotives for running over natural ground, and to which may be attached rotary or other plows to be worked by steam as a motor; and it consists in the form of the rims of the driving-wheels, and also in the steering apparatus, all of which will be hereinafter more fully described and shown.

In the drawings forming part of this specification, Figure 1 is a plan view of the invention. Fig. 2 is an end view of the steering apparatus. Figs. 3, 4, and 5 are details of the same. Fig. 6 is a side view of the locomotive, partly in section. Figs. 7 and 8 are details of the driving-wheels.

A represents the frame, which is to be made of iron, but light and strong, to support the water-tank C, boiler B, and engines E, as also all the other parts of the machinery.

D D are the driving-wheels, which are of peculiar construction and form part of my invention, the details of which are represented by Figs. 7 and 8.

In Figs. 1 and 6 the peripheries of the wheels represent flattened serrations, the alternate ones being on the same line, as seen in Fig. 7, where the line from 1 to 5 forms the faces of the teeth 1 to 2 and 4 to 5. The purpose of this construction is to give the wheel a firm bearing upon the ground which may be soft, as seen in Fig. 7 on the line $x$ $x$, which represents the ground. These serrated parts are separated by a cylindrical space, D', and the two serrated surfaces D'' D'' have their salient points alternating with each other, as seen in Fig. 7, so that when the point of a serration on one side is entering the ground the other is leaving it. This arrangement provides for the firm bearing of the wheels on soft ground, and yet furnishes sufficient asperities in a continuous series to act as spurs or cogs upon the ground to accelerate the progression of the carriage. It will be seen that if the serrated part 2 3 4, Fig. 7, should enter the ground the parts 1 to 2 and 4 to 5 would bear solidly upon the surface.

In place of serrations, scallops may be used, and in Fig. 7 is represented part of the wheel with scalloped teeth in place of the straight sides, as at 5 7 9 11 13, where there is the same result in the bearings as at 1 3 5, the line $y$ $y$ being like $x$ $x$. The points of all these teeth are notched for the purpose of taking hold of hard ground, and are no impediment in soft ground. These wheels are supported on a strong shaft, which is attached to the framework A, and any arrangement of cogged gearing can be used, which is to be driven from the cylinders E E, which are attached to the boiler B and secured to a frame.

In this application I have shown spur-gears F F attached to the driving-wheels D D, and on the same axle. These gears mesh with pinions G G on axles or shafts H H, which are in two sections—*i. e.*, each cylinder E E drives a separate crank-shaft, I, which shaft, by gearing I', will rotate gear-wheel G' on the shaft H, on which, also, is pinion G, which drives spur-gear wheel F on the driving-wheels D D, so that motion is given to driving-wheels D D from the crank-shafts I I. These shafts I I being independent, as also the shafts H H, the wheels D D rotate independently of each other, and when the machine is to be turned one wheel may be stopped or even reversed, if necessary, while the other goes ahead.

Under the frame, near the middle, are two supporting-wheels, T T, which have strong springs, on which the weight of the machine is supported, and to allow for the adjustment of the wheels in passing over irregular ground. The front wheels, T' T', are attached to an axle, U, which is a part of a cross-formed frame, Y, (seen in Fig. 5,) from the center of which is a vertical rod, $t$, having at its upper end a hand-wheel, $t'$. This rod passes through a standard, W, and also through a flanged thwart-beam, W', which is shown in detail in Fig. 4. This beam extends across the front end of the water-tank C, and is securely fastened to it and serves to sustain the rod $t$. On said rod $t$ is a pinion-wheel, $u$, which meshes with a spur-gear, $u'$, on a vertical rod, $w$, at the bottom of which is a pinion, $w'$, meshing into a larger wheel, $w''$, which engages with its cogs in a circular cogged rack secured on the curved surface of the water-tank C, these wheels $w'$ $w''$ being supported on the arm $y$ of the frame (Model.)
J. V. NICHOLS.
Electric Lamp.
No. 236,833.          Patented Jan. 18, 1881.
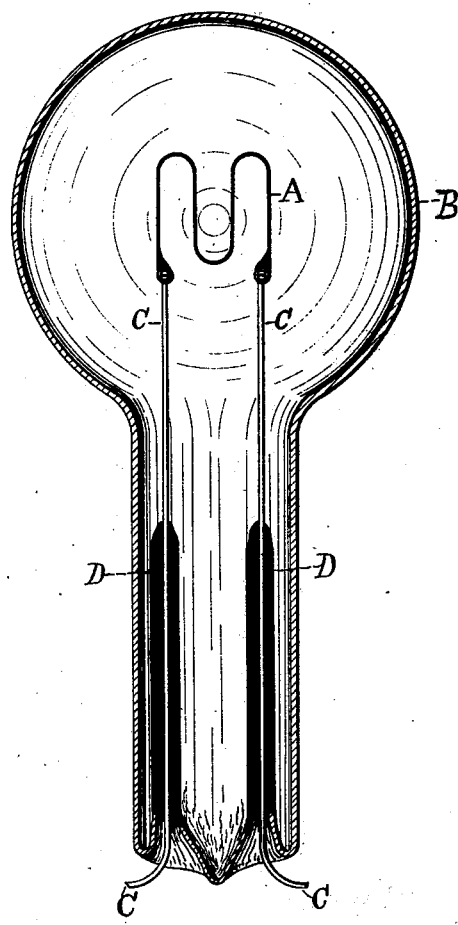
Witnesses
Henry Hine
P. S. Hine
Inventor
Joseph V. Nichols
by Leonard E. Curtis
Atty.